US012644314B2

(12) United States Patent
Lee

(10) Patent No.: US 12,644,314 B2
(45) Date of Patent: Jun. 2, 2026

(54) PUSH-PULL DOOR LOCK HAVING LATCH UNIT

(71) Applicant: ANYLOCK CO., LTD., Incheon (KR)

(72) Inventor: Hyun Jin Lee, Incheon (KR)

(73) Assignee: ANYLOCK CO., LTD. (KR)

( * ) Notice: Subject to any disclaimer, the term of this patent is extended or adjusted under 35 U.S.C. 154(b) by 57 days.

(21) Appl. No.: 18/720,617

(22) PCT Filed: Dec. 13, 2022

(86) PCT No.: PCT/KR2022/020188
§ 371 (c)(1),
(2) Date: Jun. 14, 2024

(87) PCT Pub. No.: WO2023/113415
PCT Pub. Date: Jun. 22, 2023

(65) Prior Publication Data

US 2025/0052093 A1 Feb. 13, 2025

(30) Foreign Application Priority Data

Dec. 15, 2021 (KR) ........................ 10-2021-0180163

(51) Int. Cl.
*E05B 63/22* (2006.01)
*E05B 17/04* (2006.01)
*E05B 63/08* (2006.01)

(52) U.S. Cl.
CPC ............ *E05B 63/22* (2013.01); *E05B 17/048* (2013.01); *E05B 63/08* (2013.01)

(58) Field of Classification Search
CPC ........ E05B 1/00; E05B 1/0053; E05B 1/0038; E05B 3/00; E05B 3/003; E05B 17/04;
(Continued)

(56) References Cited

U.S. PATENT DOCUMENTS 5,113,676 A * 5/1992 Panossian ............. E05B 15/102 70/462
5,927,770 A * 7/1999 Huang .................. E05B 15/102 292/169.14

(Continued)

FOREIGN PATENT DOCUMENTS

CH 383816 A * 10/1964 ............. E05C 19/02
CN 109386186 B * 10/2020 ............. E05B 59/00

(Continued)

OTHER PUBLICATIONS

KR101956107B1 Espacenet machine translation claims and description (Year: 2025).*

(Continued)

*Primary Examiner* — Steven A Tullia
(74) *Attorney, Agent, or Firm* — Renaissance IP Law Group LLP

(57) ABSTRACT

The present inventive concept relates to a push-pull door lock having a latch unit, which is provided inside a door so as to open/close the door from/to a door frame according to pushing/pulling of a handle. The latch unit comprises: a unit case which is provided to be embedded in the door so as to face the door frame; a movable bracket which is provided to be linearly movable in the unit case; an actuating cam which is provided in the movable bracket to be pivotable and is pivoted according to pushing/pulling of the handle so as to linearly move the movable bracket; an elastic member provided in the movable bracket to be elastically supported; a support block which is elastically supported by the elastic member and is provided to be latched by the movable bracket to be linearly movable along with the movable bracket; a connecting shaft provided through the support block; a latch bolt which is rotatably coupled to the connecting shaft and has an angle restriction groove formed in a portion where the connecting shaft is connected, in order (Continued)

to restrict the rotating angle thereof; and a fixed plate which has a through-hole through which the latch bolt passes and is fixedly coupled to the unit case.

6 Claims, 9 Drawing Sheets

(58) Field of Classification Search
CPC ........ E05B 17/048; E05B 63/08; E05B 63/22; E05B 63/126; E05B 63/127; E05B 15/10; E05B 15/102; E05B 2015/0437; E05B 2015/0403; E05B 2015/0406; E05B 2015/0413; E05B 2015/042; E05B 7/00; E05B 9/00; E05B 9/002; E05B 9/02; E05B 9/04; E05B 57/00; E05B 65/0835; E05C 1/14; Y10T 292/1037
USPC ........................................................... 70/91
See application file for complete search history.

(56) References Cited

U.S. PATENT DOCUMENTS

| | | | | |
|---|---|---|---|---|
| 11,220,839 | B2 * | 1/2022 | Romero | E05B 17/2038 |
| 11,306,510 | B2 * | 4/2022 | Cheng | E05B 9/002 |
| 11,598,131 | B2 * | 3/2023 | Romero | E05B 55/12 |
| 11,946,285 | B2 * | 4/2024 | Romero | E05B 55/00 |

FOREIGN PATENT DOCUMENTS

| | | | | | |
|---|---|---|---|---|---|
| DE | 102015109005 | A1 | | 12/2016 | |
| IT | 1215175 | B | * | 1/1990 | E05B 63/20 |
| JP | H0315969 | U | * | 2/1991 | E05C 1/12 |
| JP | H0427066 | U | * | 3/1992 | E05B 55/14 |
| JP | 5737630 | B2 | * | 6/2015 | E05B 15/06 |
| KR | 101563624 | B1 | * | 10/2015 | E05B 15/10 |
| KR | 101598958 | B1 | * | 3/2016 | E05B 15/10 |
| KR | 101663162 | B1 | * | 10/2016 | E05B 15/10 |
| KR | 20170023452 | A | * | 3/2017 | E05B 15/10 |
| KR | 101765329 | B1 | * | 8/2017 | E05B 49/002 |
| KR | 20170111228 | A | * | 10/2017 | E05B 17/0045 |
| KR | 20170130719 | A | * | 11/2017 | E05F 11/54 |
| KR | 101808850 | B1 | * | 1/2018 | E05B 9/04 |
| KR | 101849546 | B1 | * | 4/2018 | E05B 49/002 |
| KR | 101868469 | B1 | | 6/2018 | |
| KR | 101890318 | B1 | | 8/2018 | |
| KR | 101933839 | B1 | * | 12/2018 | E05B 17/0045 |
| KR | 20190018384 | A | * | 2/2019 | E05B 63/0017 |
| KR | 101956107 | B1 | * | 3/2019 | E05B 63/22 |
| KR | 101962898 | B1 | * | 3/2019 | E05B 63/22 |
| KR | 101982007 | B1 | * | 5/2019 | E05B 1/0038 |
| KR | 101993260 | B1 | * | 6/2019 | E05B 63/22 |
| KR | 20200082643 | A | | 7/2020 | |
| KR | 102146710 | B1 | * | 8/2020 | E05B 1/0053 |
| KR | 102151646 | B1 | * | 9/2020 | E05B 3/003 |
| WO | WO-2009096892 | A1 | * | 8/2009 | E05B 65/1086 |
| WO | WO-2017034079 | A1 | * | 3/2017 | E05B 17/00 |
| WO | WO-2017039116 | A1 | * | 3/2017 | E05B 63/22 |

OTHER PUBLICATIONS

International Search Report for PCT/KR2022/020188, mailed Mar. 21, 2023.

* cited by examiner

PUSH-PULL DOOR LOCK HAVING LATCH UNIT

TECHNICAL FIELD

The present inventive concept relates to a push-pull door lock having a latch unit, more specifically to a push-pull door lock having a latch unit that is capable of preventing a latch bolt going in and out of the latch unit from being malfunctioned, thereby softly and smoothly opening a door with a small force and firmly keeping the locked state of the door.

BACKGROUND ART

Generally, a door lock is mounted on a door for dividingly opening and closing inside and outside or on a door for dividingly opening and closing partitioned spaces in indoor space. In this case, typically, a digital door lock having a mortise and a keypad device is used for an entrance door such as a fire door, and a handle type door lock having a latch unit and handle units is generally mounted on an indoor door.

Further, instead of the digital door lock and the handle type door lock which rotate handles to release the locked state of a door, a push-pull door lock has been recently used, and the push-pull door lock is configured to allow push-pull levers located on both sides of a door to be pushed or pulled to release the locking state thereof.

In the case of the digital door lock, the mortise having a latch bolt and a dead bolt is mounted on the door, and the dead bolt goes in and out of the door by means of the operation of a driving motor built in the door lock, whereas the latch bolt goes in and out of a mortise body according to the opening and closing between the door and a door frame, thereby performing the locked or open state of the door against the door frame.

Contrarily, the door lock mounted onto the indoor door generally includes the latch unit insertedly mounted into the side of the door and the handle units fixedly mounted on the front and rear surfaces of the door in such a way as to be coupled to the latch unit, so that as a latch bolt in the latch unit is inserted or automatically protrudes according to the rotation of the handle unit, the door is open or closed.

In the case of the push-pull door lock, further, if the push-pull lever protruding outward therefrom is pulled or pushed to rotate an inside rotary body to a given angle, a rotary guider, which is connected through a latch unit to a medium converting a rotational motion into a linear motion and performing the linear motion, rotates so that a latch bolt in the latch unit goes in and out, thereby opening and closing the door.

One of conventional door locks is disclosed in Korean Patent No. 10-1868469 (hereinafter, referred to as ‘prior art document’) entitled ‘Push-pull door lock easy in conversion of direction’.

The conventional push-pull door lock easy in conversion of directions as disclosed in the prior art document includes a push-pull lever rotatably mounted on a body by means of a hinge, a rotating member located in the body in such a way as to be connected to the push-pull lever, a movable rod connected to the rotating member, a rotating pulley connected to the movable rod, while being connected to a latch unit or a rotary shaft of a mortise, and a conversion plate coupled to the body to suppress the rotational direction of the rotating member, so that before the push-pull door lock is built, the conversion plate moves to allow the door lock to be released in a pushing or pulling way, thereby the operating direction of the push-pull door lock is quickly and easily converted according to the opening and closing directions of the door.

However, the latch unit of the conventional push-pull door lock slidingly operates only in a linear direction, and through the sliding operation of the latch unit, the door is open and closed. To allow the door to be open, as a result, the latch bolt has to completely escape from the door frame.

In detail, the slidingly moving latch bolt protrudes from the latch unit in the locked state of the door and is then inserted into a locking member of the door frame, and to allow the door to be open, as the push-pull lever is pushed or pulled to convert the motion of the rotary shaft of the door locking means into the linear motion of the latch bolt, the latch bolt is completely inserted into the latch unit. In this case, at the moment when the latch bolt completely escapes from the locking member of the door frame, the door is open.

To allow the latch bolt to be kept in the state of being inserted into the latch unit to the degree of completely escaping from the locking member of the door frame, the push-pull lever has to rotate the rotary shaft of the latch unit to a sufficient angle, but through the excessive operating amount of the push-pull lever, in this case, many inconveniences are caused when the door is open. Further, the latch bolt does not operate normally due to the interference and friction resistances between the locking member of the door frame and the latch bolt, thereby frequently making the door not open well.

Besides, the latch bolt collides against the locking member of the door frame and then goes in and out of the door frame in the process where the door is open or closed, and in such a collision process, big noise may be generated, thereby failing to provide a quiet indoor environment.

DISCLOSURE

Technical Problem

Accordingly, the present inventive concept has been made in view of the above-mentioned problems occurring in the related art, and it is an object of the present inventive concept to provide a push-pull door lock having a latch unit that is capable of allowing a latch bolt going in and out of the latch unit to rotate within a restricted angle, while a door is being open and closed, thereby naturally inducing the opening and closing processes of the door.

It is another object of the present inventive concept to provide a push-pull door lock having a latch unit that is capable of allowing a latch bolt rotating in the latch unit to be restricted in a rotating angle, thereby softly and smoothly opening the door with a small force and permitting the door to be kept firmly closed.

It is yet another object of the present inventive concept to provide a push-pull door lock having a latch unit that is capable of firmly keeping the locking state of a latch bolt even if a handle rotates within the margin of error in a state where a door is locked.

Technical Solution

To accomplish the above-mentioned objects, according to the present inventive concept, there is provided a push-pull door lock having a latch unit located inside a door in such a way as to allow the door to be open and closed against a door frame according to pushing or pulling of handles, wherein the latch unit may include: a unit case built in the door in such a way as to face the door frame; a movable bracket linearly movable in the unit case; an actuating cam rotating in place in the movable bracket in such a way as to rotate according to the pushing or pulling of the handles to allow the movable bracket to linearly move; an elastic member provided in the movable bracket in such a way as to be elastically supported against the movable bracket; a support block elastically supported against the elastic member and locked onto the movable bracket in such a way as to be linearly movable along with the movable bracket; a connecting shaft provided to pass through the support block; a latch bolt rotatably coupled to the connecting shaft and having an angle restriction groove formed in a portion where the connecting shaft is connected in such a way as to restrict the rotating angle thereof; and a fixed plate fixedly coupled to the unit case and having a through hole adapted to pass the latch bolt therethrough.

Further, the angle restriction groove may restrict the rotating angle of the latch bolt in such a way as to prevent a top portion protruding from the front end portion of the latch bolt in such a way as to pass through the through hole of the fixed plate from escaping from the through hole while the latch bolt is rotating.

In detail, the angle restriction groove may include a vertical surface formed on the inside thereof in such a way as to come into contact with the connecting shaft and a slant surface formed inclinedly with respect to the vertical surface, so that the top portion of the latch bolt rotates within a range where the top portion may not escape from the through hole of the fixed plate.

Further, the support block facing the latch bolt may have a coupling protrusion or groove, and the latch bolt may have a coupling groove or protrusion corresponding to the coupling protrusion or groove of the support block, so that in a state where the door is closed, the latch bolt and the support block may be coupled to each other by means of the coupling protrusion and groove to prevent the latch bolt from rotating.

Furthermore, the support block may have a gap formed thereon in such a way as to be fittedly coupled to the movable bracket, and the gap may have a larger width than a moving distance of the movable bracket linearly moving by means of the actuating cam interlocking with the handles upon the pushing or pulling of the handles in a locking state of the latch unit.

Advantageous Effects

According to the present inventive concept, the push-pull door lock having the latch unit is configured to allow the latch bolt going in and out of the latch unit to rotate within a restricted angle, while the door is being open and closed, thereby naturally inducing the opening and closing processes of the door, softly and smoothly opening the door with a small force, and permitting the door to be kept firmly closed.

According to the present inventive concept, further, the push-pull door lock having the latch unit is configured to have the support block with the gap adapted to keep the locking state of the latch unit, even if the handle rotates within the margin of error in a state where the door is locked, thereby firmly keeping the locking state of the latch bolt to prevent the latch bolt from being malfunctioned.

MODE FOR INVENTIVE CONCEPT

Hereinafter, an embodiment of the present inventive concept will be explained in detail with reference to the attached drawings.

The terms as will be discussed later are defined in accordance with the functions of the present inventive concept, but may be varied under the intention or regulation of a user or operator. Therefore, they should be defined on the basis of the whole scope of the present inventive concept.

The disclosed embodiments are merely exemplary of the inventive concept, which can be embodied in various forms. Therefore, specific structural and functional details disclosed herein are not to be interpreted as limiting, but merely as a basis for the claims and as a representative basis for teaching one of ordinary skill in the art to variously employ the present inventive concept in virtually any appropriately detailed structure.

Terms, such as the first, the second, A, and B, may be used to describe various elements, but the elements should not be restricted by the terms. The terms are used to only distinguish one element from the other element.

Also, in explaining the example embodiments, detailed description on known elements or functions will be omitted if it is determined that such description will interfere with understanding of the embodiments.

FIGS. 1 to 9 show a push-pull door lock having a latch unit according to the present inventive concept.

Figure 1:
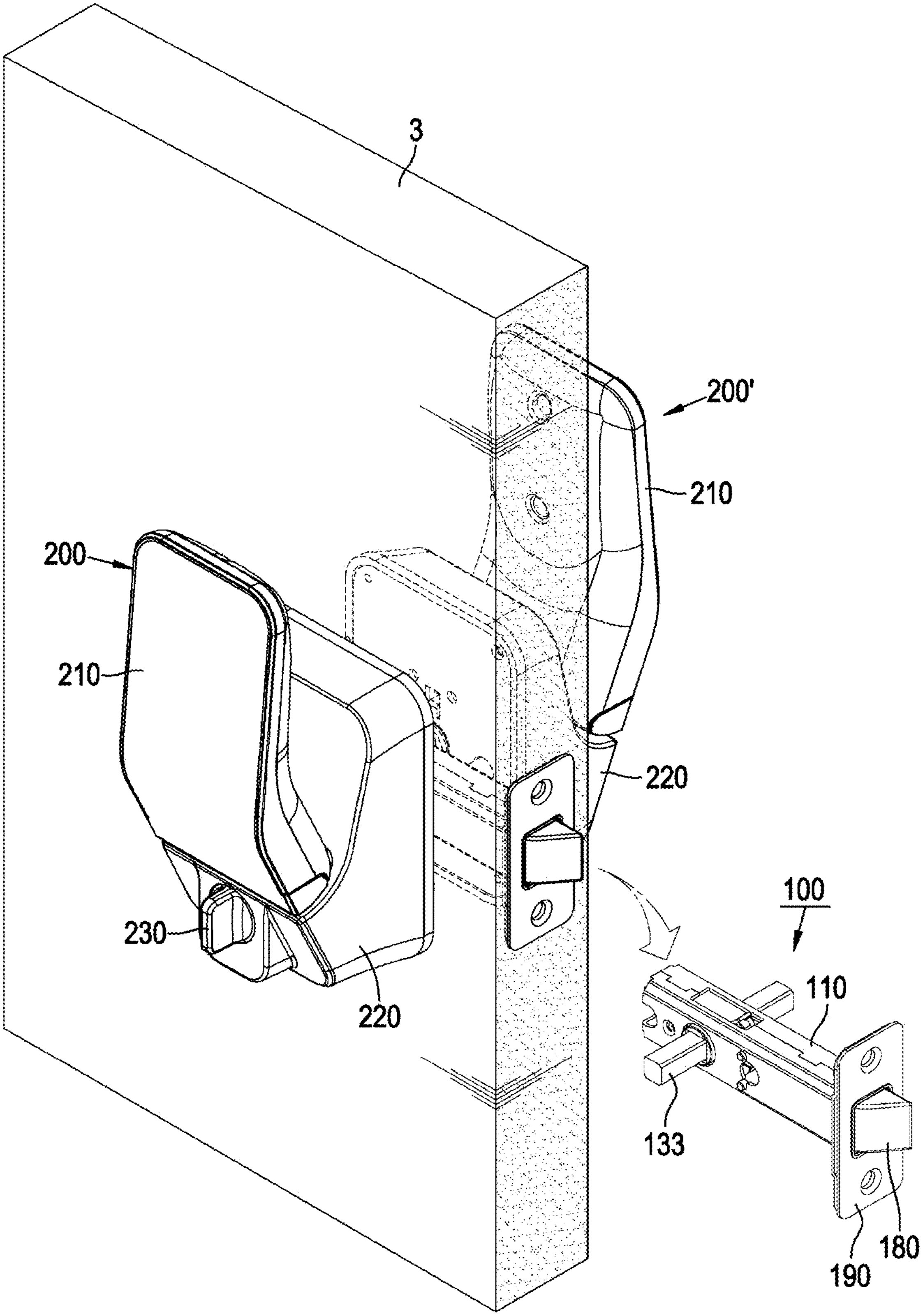
FIG. 1 is a perspective view showing a state where a push-pull door lock having a latch unit according to the present inventive concept is built on a door.

As shown in FIG. 1, a push-pull door lock according to the present inventive concept includes a latch unit 100 located inside a door 3 in such a way as to allow the door 3 to be kept closed against a door frame 1 and handle units 200 and 200' located on the indoor and outdoor sides of the door 3, respectively.

The push-pull door lock 100 is configured to push or pull handles 210 of the handle units 200 and 200' mounted on the indoor and outdoor sides of the door 3 according to the opening/closing directions of the door 3 so that the latch unit 100 is released from a locked state to permit the door 3 to be open against the door frame 1.

In detail, the door frame 1 has a locking groove 2 formed on one side of the inner surface facing the latch unit 100 of the door 3, and the locking groove 2 is adapted to lockedly insert a latch bolt 180 as will be discussed later of the latch unit 100.

As a result, the door 3 is kept firmly closed against the door frame 1 by means of the latch unit 100.

Further, as shown in FIG. 1, the latch unit 100 is built in the outer surface of the door 3 facing the locking groove 2 of the door frame 1.

As shown in FIGS. 2 to 7, the latch unit 100 includes a unit case 110 built in the outer surface of the door 3 in such a way as to face the locking groove 2 of the door frame 1, a movable bracket 120 linearly movable in the unit case 110, an actuating cam 130 rotating in place in the movable bracket 120 in such a way as to rotate according to pushing/pulling of the handles 210 to allow the movable bracket 120 to linearly move, an elastic member provided in the movable bracket 120 in such a way as to be elastically supported against the movable bracket 120, a support block 170 elastically supported against the elastic member and locked onto the movable bracket 120 in such a way as to be linearly movable along with the movable bracket 120, a connecting shaft 160 provided to pass through the support block 170, a latch bolt 180 rotatably coupled to the connecting shaft 160 and having an angle restriction groove 182 formed in a portion where the connecting shaft 160 is connected in such a way as to restrict the rotating angle thereof, and a fixed plate 190 fixedly coupled to the unit case 110 and having a through hole 191 adapted to pass the latch bolt 180 therethrough.

Figure 2:
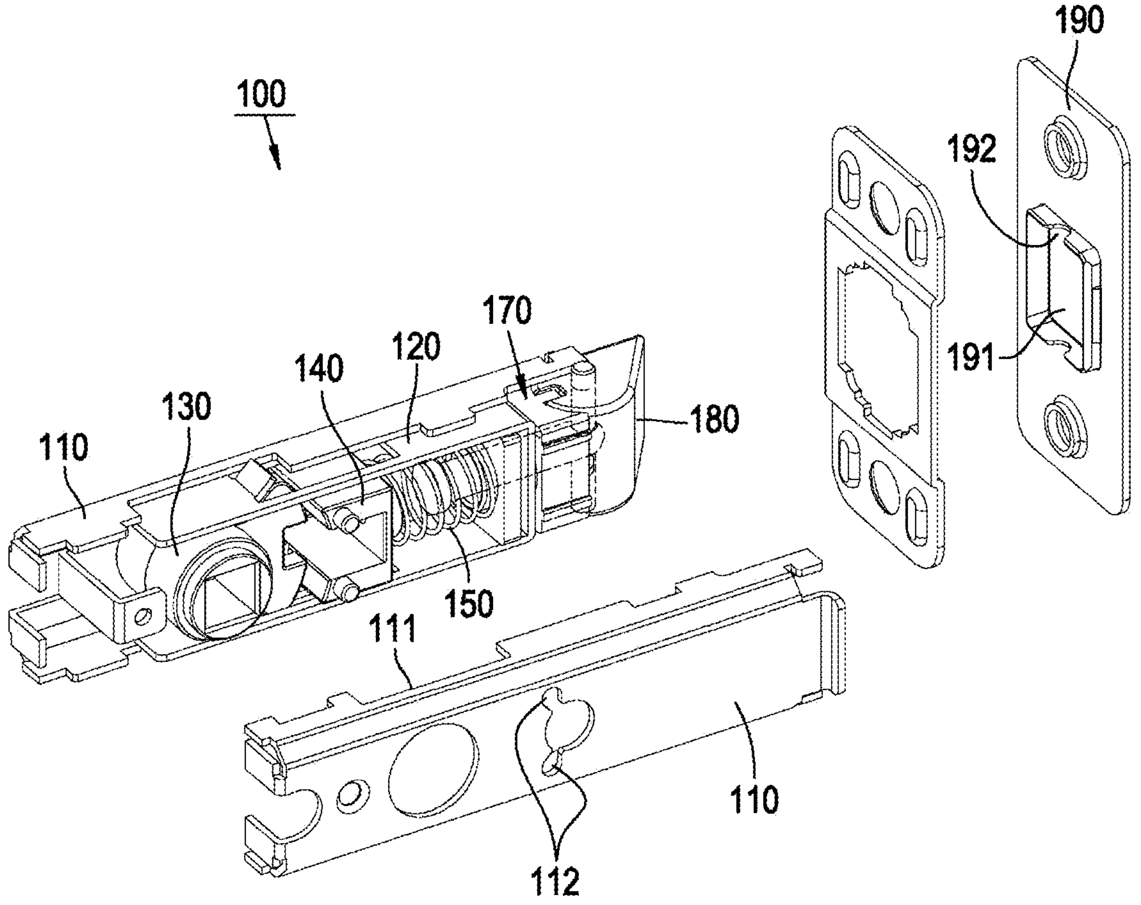
FIG. 2 is an exploded perspective view showing a state where a unit case is separated from the latch unit of the push-pull door lock according to the present inventive concept.
Figure 3:
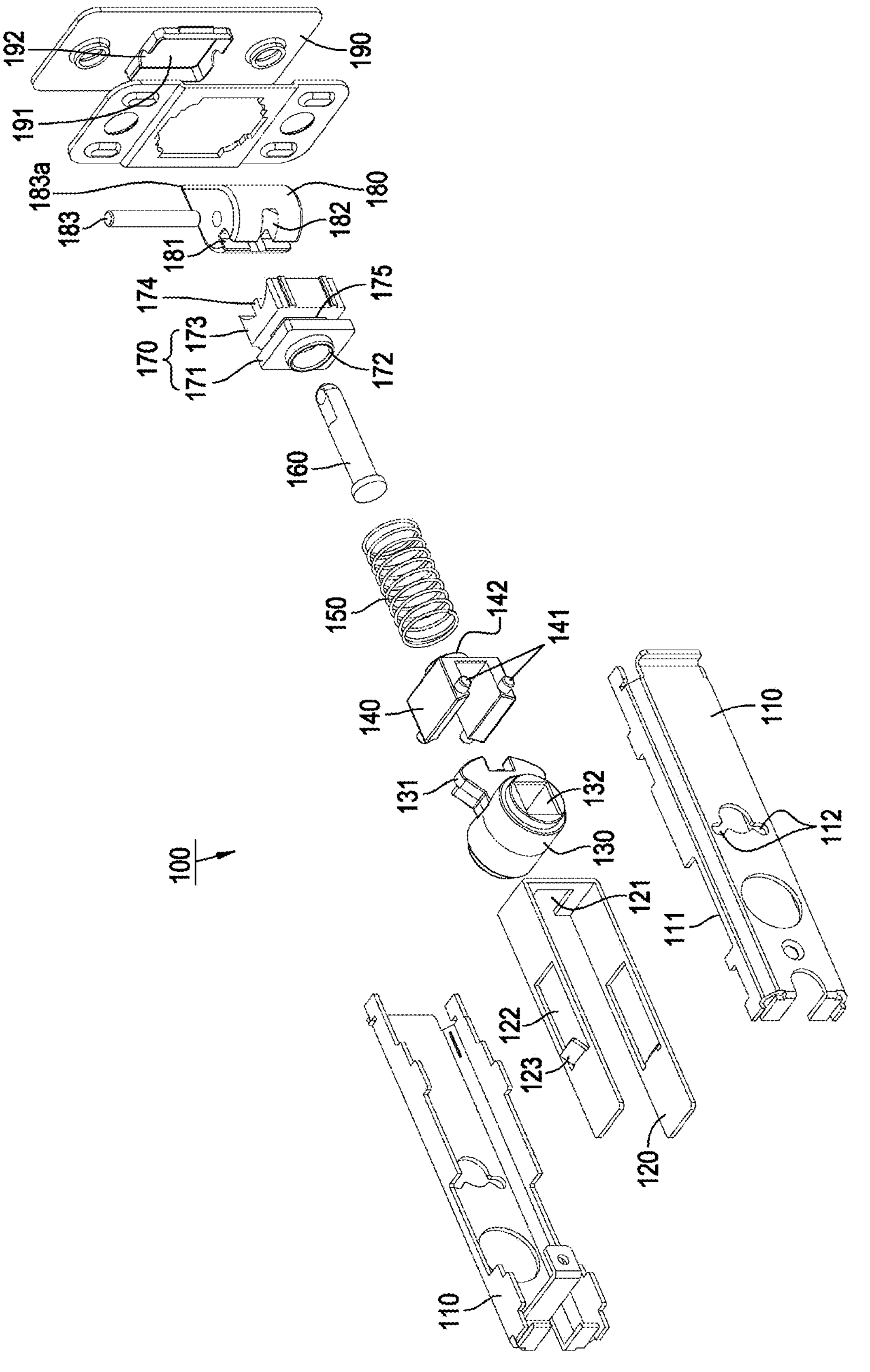
FIG. 3 is an exploded perspective view showing the latch unit of the push-pull door lock according to the present inventive concept.
Figure 4:
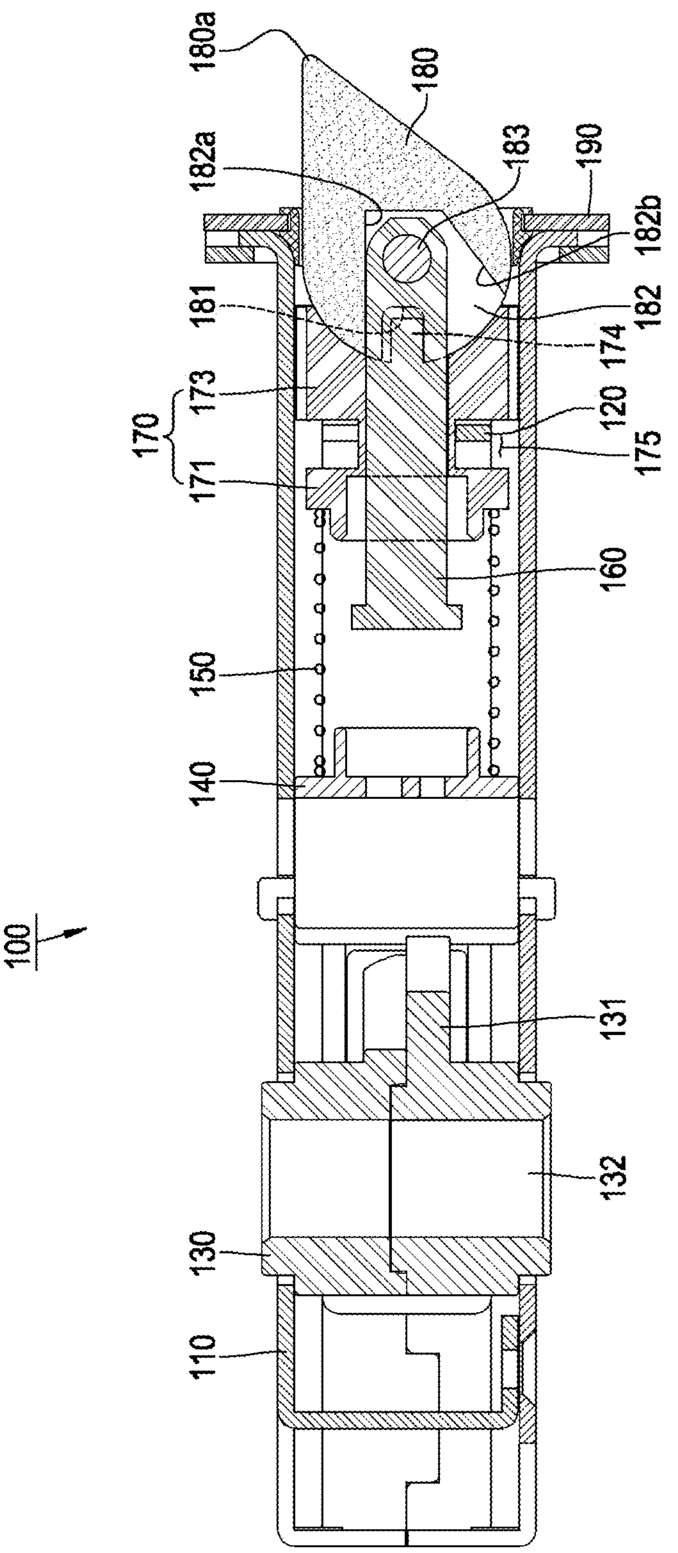
FIGS. 4 and 5 are sectional views showing a state where the latch unit of the present inventive concept is locked.
Figure 5:
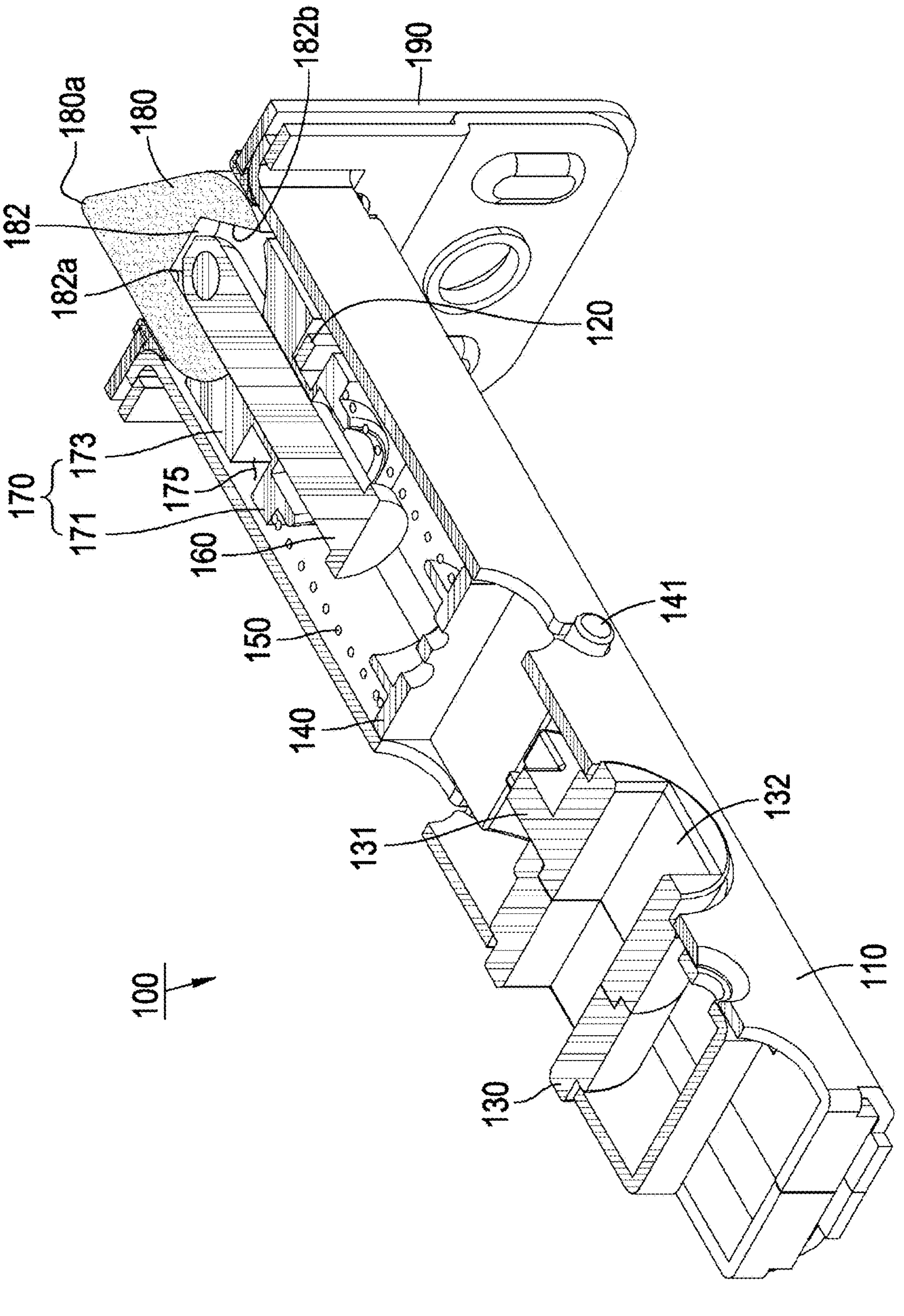
Figure 6:
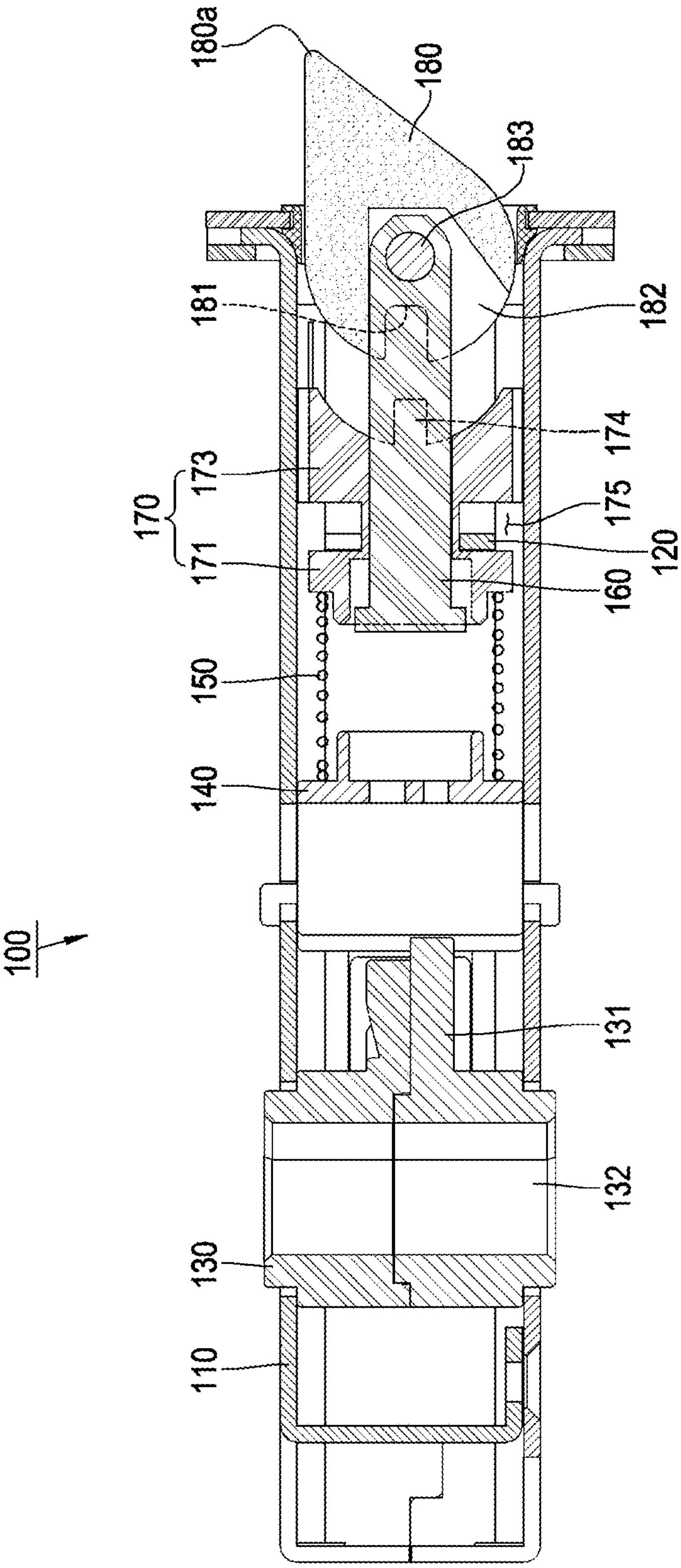
FIGS. 6 and 7 are sectional views showing a state where the latch unit of the present inventive concept is released from the locked state.
Figure 7:
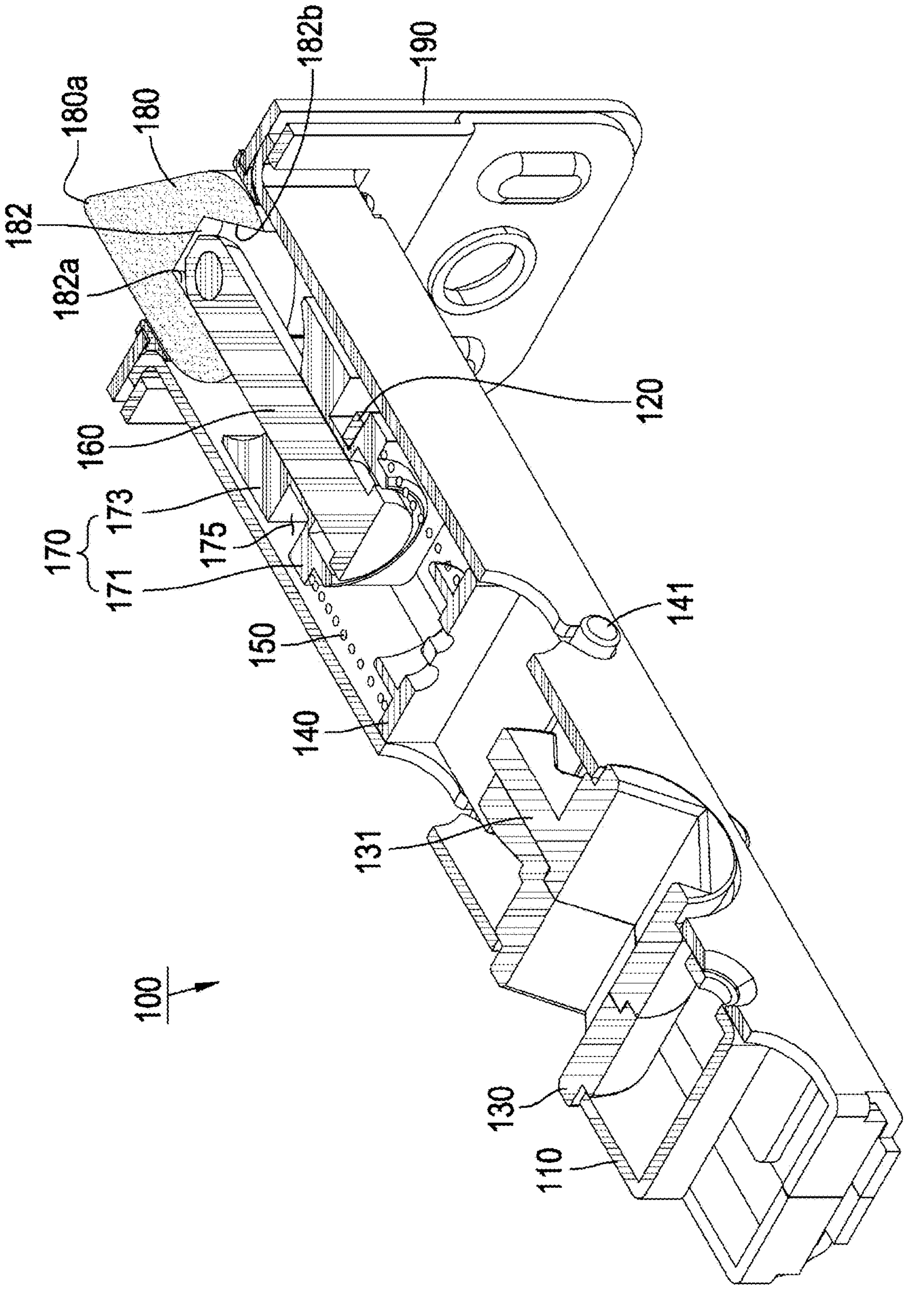

As shown in FIGS. 2 and 3, the unit case 110 is provided with a plurality of unit plates divided in a longitudinal direction thereof, and if the unit plates are coupled to each other, they are provided to the form of a hollow rectangular pipe whose front and rear surfaces are open.

Further, the unit case 110 has fixing holes 112 formed to pass through both side surfaces thereof and guide holes 111 formed to pass through top and underside surfaces thereof in such a way as to guide the movement of the movable bracket 120 and restrict the moving distance thereof. In detail, the fixing holes 112 are formed on tops and bottoms of the side surfaces of the unit case 110 in such a way as to fix a fixing block 140 as will be discussed later thereto, and the guide holes 111 are provided in the shapes of closed curves on top and underside surfaces of the unit case 110 in such a way as to pass support protrusions 123 as will be discussed later of the movable bracket 120 therethrough.

Further, the movable bracket 120 has the shape of "D" with front, top, and bottom plates, and a front through hole 121 is formed on the front plate of the movable bracket 120, whereas side through holes 122 are formed on the top and bottom plates thereof.

The front through hole 121 is open on the front plate of the movable bracket 120 in one direction, and the side through holes 122 are formed to the shapes of rectangular closed curves on the top and bottom plates thereof, while having the support protrusions 123 bendingly protruding outwardly from the rear end portions of the inner surfaces thereof.

The support protrusions 123 pass through the guide holes 111 of the unit case 110 and are thus coupled to the guide holes 111, so that while the movable bracket 120 is linearly moving, the support protrusions 123 move along the guide holes 111, and if they are locked onto both side end portions of the guide holes 111, they restrict the movement of the movable bracket 120.

Further, the actuating cam 130 rotates in place in the movable bracket 120. The actuating cam 130 has the shape of a ring with a shaft coupling hole 132 formed at the center thereof in such a way as to coupledly pass a spindle 133 therethrough, and the ring-shaped actuating cam 130 has a cam protrusion 131 protruding outward from one side of the outer peripheral surface thereof.

The shaft coupling hole 132 of the actuating cam 130 is rectangular so that it is fitted in shape to the rectangular spindle 133 to allow the actuating cam 130 and the spindle 133 to rotate integrally with each other, while being not rotatable relative to each other.

Further, the cam protrusion 131 protrudes up and down from the outer peripheral surface of the actuating cam 130 in such a way as to pass through the side through holes 122 of the movable bracket 120 and thus come into close contact with the support protrusions 123. As a result, the cam protrusion 131 rotating together with the rotation of the actuating cam 130 pushes the support protrusions 123 of the movable bracket 120 and thus moves the movable bracket 120 backward.

Furthermore, the spindle 133, which is fitted in shape to the shaft coupling hole 132 of the actuating cam 130 in such a way as to pass through the shaft coupling hole 132, passes through the movable bracket 120 and the unit case 110 and is thus coupled to the handle units 200 and 200', so that as the handles 210 of the handle units 200 and 200' are pushed or pulled, the spindle 133 rotates to cause the actuating cam 130 to rotate in one direction.

The fixing block 140 is located on one side of the actuating cam 130 inside the movable bracket 120, that is, toward the latch bolt 180 as will be discussed later, and the fixing block 140 is fixedly coupled to the unit case 110, without being movable therein.

That is, the fixing block 140 has the shape of a hexahedron of "⊂", like the movable bracket 120, while having fixing protrusions 141 protruding from tops and bottoms of both sides thereof, and the fixing protrusions 141 are directly fixedly coupled to the fixing holes 112 of the unit case 110 through both open sides of the movable bracket 120.

As a result, the fixing block 140 is fixed in the movable bracket 120, without being movable therein, and further, it does not interfere with the movable bracket 120 linearly moving.

Further, the elastic member is elastically supported between the fixing block 140 and the front plate of the movable bracket 120, and desirably, the elastic member is a compression coil spring 150 (hereinafter, referred to as "spring").

To allow the spring 150 to be located at a fixed position between the fixing block 140 and the movable bracket 120, in detail, the fixing block 140 has a cylindrical coupling boss 142 protruding from the front surface thereof, and on the corresponding side of the movable bracket 120 to the coupling boss 142 of the fixing block 140, a coupling boss 172 protrudes from the support block 170 as will be discussed later.

As a result, both side end portions of the spring 150 are fittedly coupled to the coupling bosses 142 and 172, so that the spring 150 is firmly located in a state of being elastically supported between the fixing block 140 and the movable bracket 120, and the spring 150 is thus compressed when the movable bracket 120 moves backward, so that the movable bracket 120 moving backward automatically moves forward by means of the restoring force of the spring 150.

Further, the support block 170 is fixedly coupled to the front surface of the movable bracket 120 and includes a block part 173 located on the front side thereof in such a way as to support the latch bolt 180 as will be discussed later thereagainst and a support plate 171 spaced apart from the block part 173 behind the block part 173.

A stepped gap 175 is formed between the block part 173 and the support plate 171, and the front through hole 121 formed on the front plate of the movable bracket 120 is fittedly coupled to the gap 175. In this case, the gap 175 has a larger width than the moving distance of the movable bracket 120 moving when the actuating cam 130 interlocking with the handle 210 upon pushing or pulling of the handle 210 in a locking state of the latch unit 100 minutely rotates within a margin of error.

Even if the handle 210 rotates in the margin of error in the state where the door 3 is locked, that is, in the locking state of the latch unit 100, only the movable bracket 120 of the latch unit 100 minutely moves in the gap 175 of the support block 170, while the support block 170 is being fixedly kept, without any movement, so that the rotation of the handle 210 in the locking state of the latch unit 100 is performed in an allowable margin of error, thereby firmly keeping the locking state of the latch unit 100.

Further, the coupling boss 172 protrudes from the rear surface of the support plate 171 of the support block 170, and the front end portion of the spring 150 is fitted to the coupling boss 172, so that the spring 150 is elastically supported at a fixed position.

Furthermore, the block part 173 is concavely rounded on the front surface with the corresponding curvature to the outer peripheral surface of the latch bolt 180 and has a rectangular coupling protrusion 174 protruding from the center of the front surface thereof.

Further, the latch bolt 180 has the shape of a section like a cam and is located in front of the block part 173 of the support block 170.

The latch bolt 180 has a top portion 180*a* protruding from the front end portion thereof in such a way as to be exposed to the outside through the through hole 191 of the fixed plate 190 as will be discussed later and then insertedly coupled to the locking groove 2 of the door frame 1 and a curved surface formed on the rear end portion thereof with the curvature corresponding to the block part 173.

In detail, as shown in FIG. 3, the latch bolt 180 has a coupling groove 181 corresponding to the coupling protrusion 174 of the support block 170 and the angle restriction groove 182 perpendicular to the coupling groove 180, which are formed on the rear surface (curved surface) thereof. The angle restriction groove 182 has a vertical surface 182*a* formed on one end portion communicating with the coupling groove 181 and a slant surface 182*b* formed on the other end portion thereof in such a way as to be outwardly slant to an angle of about 45° with respect to the vertical surface 182*a*.

As shown in FIGS. 4 to 7, the connecting shaft 160 comes into contact with the vertical surface 182*a* and the slant surface 182*b* of the angle restriction groove 182, thereby stopping the rotation of the latch bolt 180, and while the latch bolt 180 is rotating, therefore, the rotating angle of the latch bolt 180 is restricted within the range where the top portion 180*a* of the latch bolt 180 passing through the through hole 191 of the fixed plate 190 does not escape from the through hole 191, so that the overrun, that is, excessive rotation of the latch bolt 180 is prevented to in advance avoid the malfunction of the latch unit 100.

The latch bolt 180 is restrictedly located together with the support block 170 by means of the connecting shaft 160. In detail, the connecting shaft 160 passes through the support plate 171 and the block part 173 of the support block 170, and the connecting shaft 160 has a front end portion protruding forward therefrom toward the block part 173 of the support block 170 in such a way as to be coupled to the latch bolt 180 by means of a hinge pin 183.

As a result, the latch bolt 180 rotates in one direction on the connecting shaft 160, and upon the rotation of the latch bolt 180, therefore, the connecting shaft 160 comes into contact with the vertical surface 182*a* or the slant surface 182*b* of the angle restriction groove 182 and thus stops the rotation of the latch bolt 180.

If the coupling protrusion 174 of the support block 170 is insertedly coupled to the coupling groove 181 formed on the rear surface of the latch bolt 180, further, the latch bolt 180 is in a fixed state, without being rotatable, which is a state where the door 3 is closed against the door frame 1, so that the closed state of the door 3 is firmly kept.

Further, the fixed plate 190 is coupled to the front end portion of the unit case 110 and thus temporarily fixedly coupled to the outer surface of the door 3. The fixed plate 190 has the through hole 191 through which the top portion 180*a* of the latch bolt 180 passes, and the through hole 191 has stop grooves 192 concavely formed on the portions protruding therefrom toward the unit case 110. The hinge pin 183 coupled to the latch bolt 180 is lockedly located onto the stop grooves 192, thereby preventing the latch bolt 180 from escaping from the latch unit 100.

Further, as shown in FIG. 1, the handle units 200 and 200' include the indoor handle located on the indoor side of the door 3 and the outdoor handle located on the outdoor side of the door 3, around the latch unit 100.

The facing surfaces of the outdoor handle and the indoor handle are connected to the single spindle 133 located in the latch unit 100 so that the outdoor handle and the indoor handle interlock with each other.

Hereinafter, the outdoor handle and the indoor handle are denoted by one handle 210 as the same reference numeral as each other, but only in explaining differences between the two handles 210, the handle 210 is divided into outdoor and indoor handles.

Each of the handle units 200 and 200' includes a body 220 fixedly coupled to the door 3 and the handle 210 rotatably located on the outer surface of the body 220 to release the locking state of the latch unit 100 when pushed or pulled.

A lower end portion of the handle 210 is coupled to the body 220 by means of a hinge, and therefore, an upper end portion of the handle 210 around the hinged portion of the lower end portion thereof pushedly rotates toward the body 220 or pulledly rotates in such a way as to be distant from the body 220.

Further, the handle 210 is provided with an elastic means such as a torsion spring for returning to its original position, and a reference numeral "230" not explained yet represents a key knob rotatably located on the indoor body 220 to lock the latch unit 100.

Now, an explanation of operations of the latch unit provided on the push-pull door lock according to the present inventive concept will be given.

Figure 8:
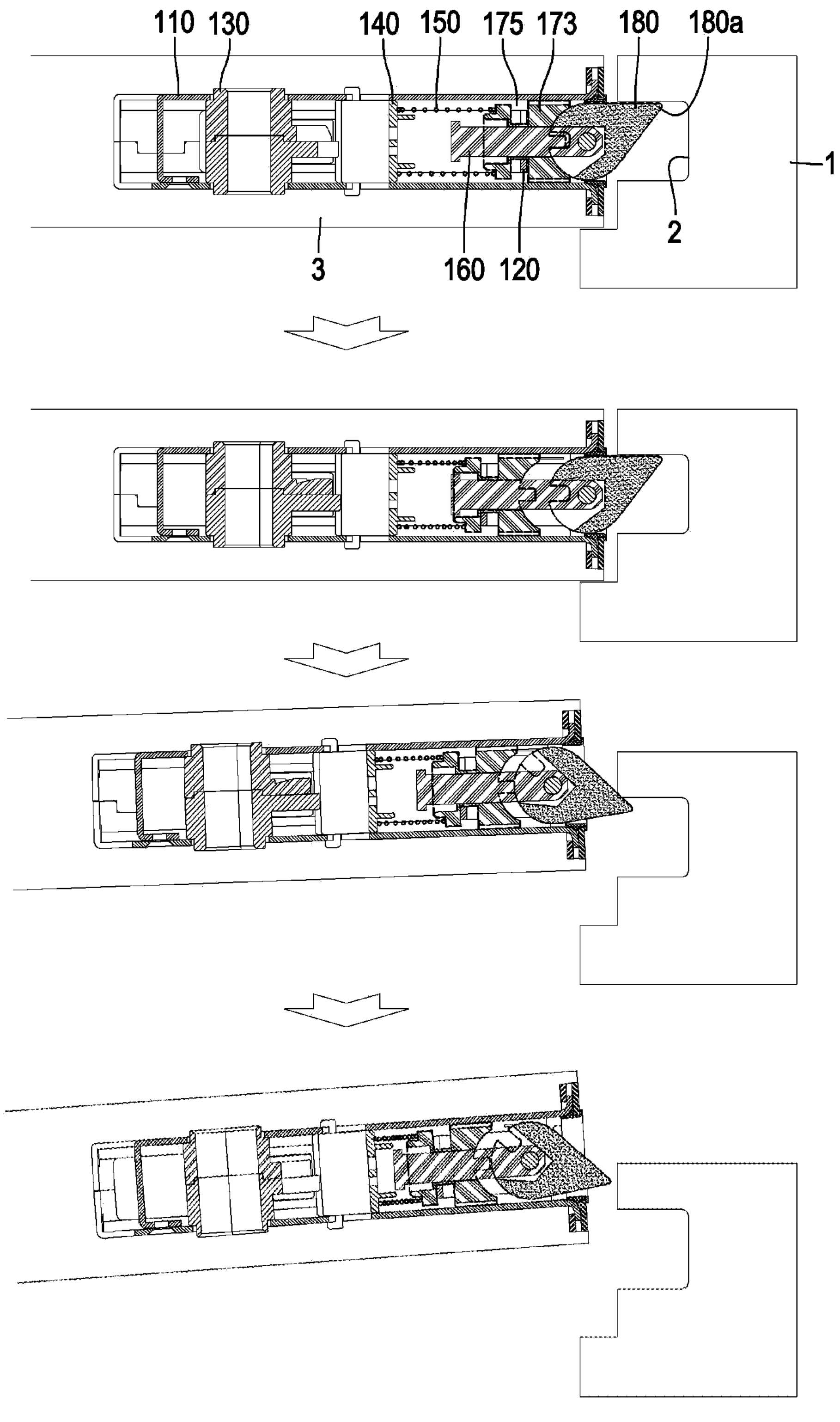
FIGS. 8 and 9 are side views showing processes where the latch unit of the present inventive concept is open and closed against the door.

First, if it is desired to open the door 3, in a state where the door 3 is coupled to the door frame 1 and thus closed against the door frame 1, like a first state as shown in the uppermost position of FIG. 8, the indoor or outdoor handle 210 is pushed or pulled so that the spindle 133 interlocks with the handle 210 and rotates in one direction.

As a result, the actuating cam 130 rotates in one direction by means of the rotation of the spindle 133 to allow the cam protrusion 131 to push the support protrusions 123 backward, so that the movable bracket 120 moves backward in the unit case 110.

By means of the backward movement of the movable bracket 120, the support block 170 moves in the same direction as the movable bracket 120, and in this process, the spring located between the movable bracket 120 and the fixing block 140 is in the compressed state, like second to fourth states as shown in FIG. 8.

If the support block 170 moves backward together with the movable bracket 120, further, the coupling protrusion 174 of the support block 170 escapes from the coupling groove 181 of the latch bolt 180, like the second state as shown in FIG. 8, so that the latch bolt 180 freely rotates in one direction in the state of being coupled to the connecting shaft 160 by means of the hinge.

In this state, if the door 3 rotates in a direction where it is open, the latch bolt 180 rotates in one direction, like the third state as shown in FIG. 8, in the state where the top portion 180*a* is locked onto the locking groove 2 of the door frame 1, and such a rotation of the latch bolt 180 is performed until the connecting shaft 160 lockedly comes into contact with the slant surface 182*b* of the angle restriction groove 182.

In a state where the latch bolt 180 completely rotates, like the fourth state as shown in FIG. 8, further, the connecting shaft 160 coupled to the latch bolt 180 by means of the hinge comes into contact with the slant surface 182*b* of the angle restriction groove 182, and in this state, the top portion 180*a* of the latch bolt 180 moves from one side of the through hole 191 of the fixed plate 190 to the other side thereof, so that the latch bolt 180 is released from the locking groove 2 of the door frame 1.

As a result, the door 3 is naturally open, and in this process, the rotating latch bolt 180 rotates only to the angle of about 45° where the top portion 180*a* does not escape from the through hole 191 of the fixed plate 190, so that the latch unit 100 is prevented from being malfunctioned due to excessive rotation thereof.

Figure 9:
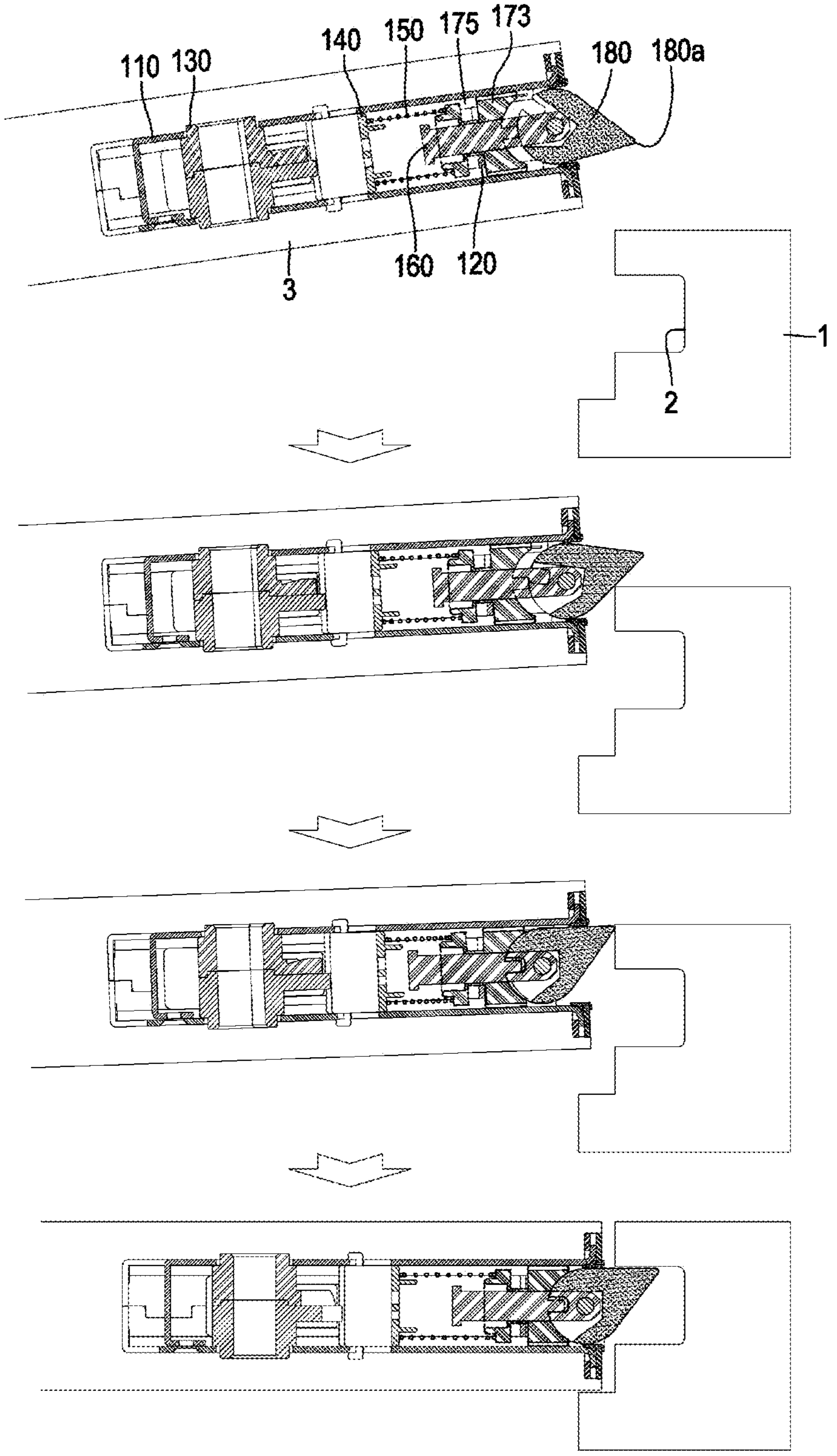

In the state where the door 3 is open, like a first state as shown in FIG. 9, the support block 170 is separated from the latch bolt 180 by means of the coupling protrusion 174, and the connecting shaft 160 comes into contact with the slant surface 182*b* of the angle restriction groove 182.

If the door 3 is closed, in this state, the latch bolt 180 is locked onto the outer surface of the door frame 1, like a second state as shown in FIG. 9, but even in this state, the door 3 rotates more in a direction where it is closed.

As a result, in this process, the latch bolt 180 rotates in the opposite direction to the open direction of the door 3 to allow the coupling groove 181 to be correspondingly coupled to the coupling protrusion 174 of the support and block 170, simultaneously, the latch bolt 180 rotating in the state of coming into contact with the door frame 1 is inserted inside the door 3 by means of the external force generated by the rotation of the door 3, like a third state as shown in FIG. 9.

If the latch bolt 180 is inserted, the support block 170 coupled to the latch bolt 180 moves backward in the unit case 110 to allow the spring 150 to be compressed.

As a result, if the latch bolt 180 locked onto the outer surface of the door frame 1 moves toward the locking groove 2 in the state where the top portion 180*a* comes into contact with the inner surface of the door frame 1 where the locking groove 2 is formed and is thus located in the locking groove 2, the latch bolt 180 goes out of the latch unit 100 by means of the restoring force (tension force) of the spring 150 and is thus lockedly inserted into the locking groove 2 of the door frame 1, like a fourth state as shown in FIG. 9.

In this case, the latch bolt 180 is not rotatable as the coupling protrusion 174 of the support block 170 is coupled to the coupling groove 181 thereof, so that the door 3 is kept firmly closed.

The foregoing description of the embodiments of the inventive concept has been presented for the purpose of illustration; it is not intended to be exhaustive or to limit the inventive concept to the precise forms disclosed. Persons skilled in the relevant art can appreciate that many modifications and variations are possible in light of the above teachings.

It is therefore intended that the scope of the inventive concept be limited not by this detailed description, but rather by the claims appended hereto.

The invention claimed is:

1. A push-pull door lock having a latch unit located inside a door in such a way as to allow the door to be open and closed against a door frame according to pushing or pulling of handles, wherein the latch unit comprises:

a unit case built in the door in such a way as to face the door frame;

a movable bracket linearly movable in the unit case;

an actuating cam rotatable in place in the movable bracket in such a way as to be capable of rotating according to the pushing or pulling of the handles to allow the movable bracket to linearly move, the actuating cam having a cam protrusion configured to push the movable bracket backward when the actuating cam rotates;

an elastic member provided in the movable bracket in such a way as to be elastically supported against the movable bracket;

a support block elastically supported against the elastic member and locked onto the movable bracket in such a way as to be linearly movable along with the movable bracket, the support block having a coupling protrusion;

a connecting shaft provided to pass through the support block and supported by the support block such that the connecting shaft is movable together with the support block when the support block moves backward;

a latch bolt rotatably coupled to the connecting shaft and having:

an angle restriction groove formed in a portion where the connecting shaft is connected in such a way as to restrict the rotating angle thereof; and a coupling groove corresponding to the coupling protrusion of the support block, wherein, when the actuating cam rotates to move the movable bracket backward, the support block is movable backward together with the movable bracket, and the connecting shaft is movable backward together with the support block, such that the coupling protrusion can escape from the coupling groove, thereby allowing the latch bolt to freely rotate on the connecting shaft; and a fixed plate fixedly coupled to the unit case and having a through hole adapted to pass the latch bolt therethrough.

2. The push-pull door lock according to claim 1, wherein the angle restriction groove restricts the rotating angle of the latch bolt in such a way as to prevent a top portion protruding from the front end portion of the latch bolt in such a way as to pass through the through hole of the fixed plate from escaping from the through hole while the latch bolt is rotating.

3. The push-pull door lock according to claim 2, wherein the angle restriction groove comprises a vertical surface formed on the inside thereof in such a way as to come into contact with the connecting shaft and a slant surface formed inclinedly with respect to the vertical surface, so that the top portion of the latch bolt is rotatable within a range where the top portion does not escape from the through hole of the fixed plate.

4. The push-pull door lock according to claim 1, wherein when the door is closed, the coupling protrusion of the support block is insertable into the coupling groove of the latch bolt to prevent the latch bolt from rotating, and when the door is being opened and the movable bracket moves backward, the coupling protrusion can escape from the coupling groove to allow the latch bolt to freely rotate.

5. The push-pull door lock according to claim 1, wherein the support block has a gap formed thereon in such a way as to be fittedly coupled to the movable bracket, and the gap has a larger width than a moving distance of the movable bracket linearly moving by means of the actuating cam interlocking with the handles upon the pushing or pulling of the handles in a locking state of the latch unit.

6. The push-pull door lock according to claim 1, wherein the latch bolt is rotatably coupled to the connecting shaft at a central region of the latch bolt via a hinge pin, such that the latch bolt is rotatable around the connecting shaft as a central rotational axis.

* * * * *